US007491252B2

(12) United States Patent
Bian

(10) Patent No.: US 7,491,252 B2

(45) Date of Patent: *Feb. 17, 2009

(54) TANTALUM BARRIER REMOVAL SOLUTION

(75) Inventor: Jinru Bian, Newark, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 236 days.

This patent is subject to a terminal disclaimer.

(21) Appl. No.: 10/396,013

(22) Filed: Mar. 25, 2003

(65) Prior Publication Data

US 2003/0181345 A1 Sep. 25, 2003

Related U.S. Application Data

(60) Provisional application No. 60/367,402, filed on Mar. 25, 2002.

(51) Int. Cl.

| | |
|---|---|
| ***C09G 1/00*** | (2006.01) |
| ***C09G 1/02*** | (2006.01) |
| ***C09G 1/04*** | (2006.01) |
| ***C11D 7/50*** | (2006.01) |

(52) U.S. Cl. ............................ 51/307; 51/308; 51/309; 106/3; 510/380; 510/397; 510/175; 510/367; 510/368

(58) Field of Classification Search .................. 51/307, 51/308, 309; 106/3; 252/79.1; 510/175, 510/367, 368, 369, 370, 375, 379, 380, 397
See application file for complete search history.

(56) References Cited

U.S. PATENT DOCUMENTS

| | | | | |
|---|---|---|---|---|
| 3,895,956 | A | 7/1975 | Yoshida et al. | |
| 5,860,848 | A | 1/1999 | Loncki et al. | |
| 6,001,730 | A | 12/1999 | Farkas et al. | |
| 6,436,834 | B1 * | 8/2002 | Lee et al. | 438/693 |
| 2002/0019202 | A1 | 2/2002 | Thomas et al. | |
| 2002/0025762 | A1 | 2/2002 | Luo et al. | |

FOREIGN PATENT DOCUMENTS

| | | | |
|---|---|---|---|
| EP | 0 678 571 | A2 | 10/1995 |
| EP | 1 072 662 | A1 | 1/2001 |
| GB | 679561 | | 9/1952 |
| WO | WO 96/38262 | A1 | 12/1996 |
| WO | WO 01/12740 | A1 | 2/2001 |

* cited by examiner

*Primary Examiner*—Michael A Marcheschi
(74) *Attorney, Agent, or Firm*—Blake T. Biederman

(57) ABSTRACT

A chemical mechanical planarization solution is useful for removing tantalum barrier materials. The solution includes by weight percent 0 to 25 oxidizer, 0 to 15 inhibitor for a nonferrous metal and 0 to 20 complexing agent for the nonferrous metal, 0.01 to 12 tantalum removal agent selected from the group consisting of formamidine, formamidine salts, formamidine derivatives, guanidine derivatives, guanidine salts and mixtures thereof, 0 to 5 abrasive, 0 to 15 total particles selected from the group consisting of polymeric particles and polymer-coated coated particles and balance water. The solution has a tantalum nitride to TEOS selectivity of at least 3 to 1 as measured with a microporous polyurethane polishing pad pressure measure normal to a wafer less than 20.7 kPa.

9 Claims, No Drawings

TANTALUM BARRIER REMOVAL SOLUTION

CROSS-REFERENCE TO RELATED APPLICATIONS

This application claims the benefit of provisional application No. 60/367,402, filed Mar. 25, 2002.

BACKGROUND OF THE INVENTION

The invention relates to chemical mechanical planarization (CMP) of semiconductor wafer materials and, more particularly, to CMP compositions and methods for removing barrier materials of semiconductor wafers in the presence of underlying dielectrics.

Typically, a semiconductor wafer has a wafer of silicon and a dielectric layer containing multiple trenches arranged to form a pattern for circuit interconnects within the dielectric layer. The pattern arrangements usually have a damascene structure or dual damascene structure. A barrier layer covers the patterned dielectric layer and a metal layer covers the barrier layer. The metal layer has at least sufficient thickness to fill the patterned trenches with metal to form circuit interconnects.

CMP processes often include multiple planarization steps. For example, a first step removes a metal layer from underlying barrier dielectric layers. The first step polishing removes the metal layer, while leaving a smooth planar surface on the wafer with metal-filled trenches that provide circuit interconnects planar to the polished surface. First step polishing steps tend to remove excess interconnect metals, such as copper at an initial high rate. For example, Lee et al., in EP Pat. Pub. No. 1 072 662 A1, disclose the use of guanidine as an abrasion accelerator for accelerating an abrasive composition's dielectric removal rate. After the first step removal, the second step polishing can remove a barrier that remains on the semiconductor wafer. This second step polishing removes the barrier from an underlying dielectric layer of a semiconductor wafer to provide a planar polished surface on the dielectric layer.

Unfortunately, CMP processes often result in the excess removal of unwanted metal from circuit interconnects or dishing. This dishing can result from, both first step polishing, and second step polishing. Dishing in excess of acceptable levels causes dimensional losses in the circuit interconnects. These "thin" areas in the circuit interconnects attenuate electrical signals and impair continued fabrication of dual damascene structures.

A barrier typically is a metal, metal alloy or intermetallic compound, such as tantalum or tantalum nitride. The barrier forms a layer that prevents migration or diffusion between layers within a wafer. For example, barriers prevent the diffusion of interconnect metal such as copper or silver into an adjacent dielectric. Barrier materials must be resistant to corrosion by most acids, and thereby, resist dissolution in a fluid polishing composition for CMP. Furthermore, these barrier materials may exhibit a toughness that resists removal by abrasion abrasive particles in a CMP slurry and from fixed abrasive pads.

Erosion refers to unwanted recesses in the surface of dielectric layers that result from removing some of the dielectric layer by the CMP process. Erosion that occurs adjacent to the metal in trenches causes dimensional defects in the circuit interconnects. These defects contribute to attenuation of electrical signals transmitted by the circuit interconnects and impair subsequent fabrication of a dual damascene structures in a manner similar to dishing. The removal rate of the barrier, versus, a removal rate of the metal interconnect or the dielectric layer is known as the selectivity ratio.

Most barrier materials are difficult to remove by CMP, because the barrier materials resist removal by abrasion and by dissolution. Typical barrier removal slurries require a high abrasive concentration, such as at least 7.5 weight percent, in a fluid polishing composition to remove a barrier material. But slurries having these high abrasive concentrations tend to provide detrimental erosion to the dielectric layer and result in dishing, erosion and scratching of the copper interconnect. In addition to this, high abrasive concentrations can result in peeling or delaminating of low-k dielectric layers from semiconductor wafers.

There is an unsatisfied demand for an improved CMP composition for selectively removing tantalum barrier materials. In particular, there is a need for a CMP composition for selectively removing tantalum barrier materials with reduced dielectric erosion and reduced dishing, erosion and scratching of the metal interconnect. Furthermore, there is a desire to remove tantalum barrier materials without peeling low-k dielectric layers from semiconductor wafers.

STATEMENT OF THE INVENTION

The invention provides a chemical mechanical planarization solution useful for removing a tantalum barrier material comprising by weight percent 0 to 25 oxidizer, 0 to 15 inhibitor for a nonferrous metal, 0 to 20 complexing agent for the nonferrous metal, 0.01 to 12 tantalum removal agent selected from the group consisting of formamidine, formamidine salts, formamidine derivatives, guanidine derivatives, guanidine salts and mixtures thereof, 0 to 5 abrasive, 0 to 15 total particles selected from the group consisting of polymeric particles and polymer-coated coated particles and balance water and the solution has a tantalum nitride to TEOS selectivity of at least 3 to 1 as measured with a microporous polyurethane polishing pad pressure measured normal to a wafer of less than 20.7 kPa (3 psi).

In addition, the invention provides a chemical mechanical planarization method for removing a tantalum barrier material from a semiconductor wafer comprising the steps of: contacting a wafer substrate with a polishing solution, the wafer substrate containing a tantalum barrier material and a dielectric, the polishing solution containing a tantalum agent selected from the group consisting of formamidine, formamidine salts, formamidine derivatives, guanidine derivatives, guanidine salts and mixtures thereof; and polishing the wafer substrate with a polishing pad to remove the tantalum barrier material from the wafer substrate at a removal rate greater than a removal rate for the dielectric as expressed in angstroms per minute.

DETAILED DESCRIPTION

The solution and method provide unexpected selectivity for removing tantalum barrier materials. The solution relies upon a tantalum barrier removal agent selected from the group consisting of formamidine, formamidine salts, formamidine derivatives, such as guanidine, guanidine derivatives, guanidine salts and mixtures thereof to selectively remove tantalum barrier materials. The solution selectively removes barrier materials with reduced dielectric erosion and reduced dishing, erosion and scratching of the metal interconnects, such as copper. Furthermore, the solution removes tantalum barrier materials without peeling or delaminating low-k dielectric layers from semiconductor wafers.

The solution relies upon a barrier removal agent to remove tantalum barrier materials. For purposes of this specification, tantalum barrier refers to tantalum, tantalum-containing alloy, tantalum-base alloys and tantalum intermetallics. The solution has particular effectiveness for tantalum, tantalum-base alloys and tantalum intermetallics, such as tantalum carbides, nitrides and oxides. The slurry is most effective for removing tantalum barriers from patterned semiconductor wafers.

The tantalum barrier removal agent may be formamidine, a formamidine salt, a formamidine derivative such as, guanidine, a guanidine derivative, a guanidine salt or a mixture thereof. These tantalum removal agents appear to have a strong affinity for tantalum barrier materials. This affinity for tantalum can accelerate the barrier removal rate with limited abrasive or optionally, without the use of any abrasives. This limited use of abrasive allows the polishing to remove the tantalum barrier at a rate greater than the dielectric and the metal interconnect. Particular effective guanidine derivatives and salts include guanidine hydrochloride, guanidine sulfate, amino-guanidine hydrochloride, guanidine acetic acid, guanidine carbonate, guanidine nitrate, formamidine, formamidinesulfinic acid, formamidine acetate and mixtures thereof. Advantageously, the solution contains 0.01 to 12 weight percent tantalum removal agent. This specification expresses all concentrations in weight percent. Most advantageously, the solution contains 0.1 to 10 weight percent tantalum removal agent and for most applications, tantalum removal agent concentrations between 0.2 and 6 weight percent provide sufficient barrier removal rates.

The tantalum removal agent provides efficacy over a broad pH range in solutions containing a balance of water. This solution's useful pH range extends at least from 2 to 12. In addition, the solution most advantageously relies upon a balance of deionized water to limit incidental impurities.

Optionally, the solution contains 0 to 25 weight percent oxidizer. Advantageously, the optional oxidizer is in the range of 0 to 15 weight percent. The oxidizer is particularly effective at assisting the solution in removing tantalum oxide films that can form at acidic pH levels and in particular, those films that can form at pH levels of 5 and below. The oxidizing agent can be at least one of a number of oxidizing compounds, such as hydrogen peroxide ($H_2O_2$), monopersulfates, iodates, magnesium perphthalate, peracetic acid and other per-acids, persulfates, bromates, periodates, nitrates, iron salts, cerium salts, Mn (III), Mn (IV) and Mn (VI) salts, silver salts, Cu salts, chromium salts, cobalt salts, halogens hypochlorites and mixtures thereof. Furthermore, it is often advantageous to use a mixture of oxidizer compounds. The preferred barrier metal polishing slurry includes a hydrogen peroxide oxidizing agent. When the polishing slurry contains an unstable oxidizing agent such as, hydrogen peroxide, it is often most advantageous to mix the oxidizer into the slurry at the point of use.

Typical nonferrous metal interconnects include: copper, copper-base alloys, silver and silver-base alloys. Optionally, the solution contains 0 to 15 weight percent inhibitor to control interconnect removal rate by static etch or other removal mechanism. Adjusting the concentration of an inhibitor adjusts the interconnect metal removal rate by protecting the metal from static etch. Advantageously, the solution contains an optional 0 to 10 weight percent inhibitor. The inhibitor may consist of a mixture of inhibitors. Azole inhibitors are particularly effective for copper and silver interconnects. Typical azole inhibitors include benzotriazole (BTA), tolytriazole, imidazole and other azole compounds. Most advantageously the slurry contains 0.02 to 5 weight percent total azole for inhibiting static etch of copper or silver interconnects. BTA is a particularly effective inhibitor for copper and silver.

In addition to the inhibitor, the solution may contain 0 to 20 weight percent complexing agent for the nonferrous metal. The complexing agent, when present, prevents precipitation of the metal ions formed by dissolving the nonferrous metal interconnects. Most advantageously, the solution contains 0 to 10 weight percent complexing agent for the nonferrous metal. Example complexing agents include acetic acid, citric acid, ethyl acetoacetate, glycolic acid, lactic acid, malic acid, oxalic acid, salicylic acid, sodium diethyl dithiocarbamate, succinic acid, tartaric acid, thioglycolic acid, glycine, alanine, aspartic acid, ethylene diamine, trimethyl diamine, malonic acid, gluteric acid, 3-hydroxybutyric acid, propionic acid, phthalic acid, isophthalic acid, 3-hydroxy salicylic acid, 3,5-dihydroxy salicylic acid, gallic acid, gluconic acid, pyrocatechol, pyrogallol, tannic acid, salts and mixtures thereof. Advantageously, the complexing agent is selected from the group consisting of acetic acid, citric acid, ethyl acetoacetate, glycolic acid, lactic acid, malic acid, oxalic acid and mixtures thereof. Most advantageously, the complexing agent is citric acid.

The use of the tantalum removal agent facilitates polishing with low abrasive concentrations, such as those below 5 weight percent. For polishing solutions containing less than 5 weight percent abrasive, the polishing can readily remove the tantalum barrier material at a rate of at least three times greater than the dielectric removal rate as expressed in angstroms per minute. For polishing solutions containing less than 1 weight percent abrasive, the polishing can readily remove the tantalum barrier material at a rate of at least five times greater than the dielectric removal rate as expressed in angstroms per minute. Typical abrasives include diamond particles and metal oxides, borides, carbides and nitrides and mixture thereof. Most advantageously, if present, the abrasive is selected from the group consisting of alumina, ceria and silica and mixtures thereof. For ultra-reduced dielectric erosion rates, the solution advantageously contains less than 0.09 weight percent abrasive and most advantageously less than 0.05 weight percent abrasive. Although the solution is effective with zero concentration levels of abrasive, a small amount of abrasive facilitates polishing debris removal. To limit scratching, the solution advantageously contains abrasives having an average particle size of less than 200 nm and most advantageously, an average particle size less than 100 nm.

For debris removal, the solution may contain 0 to 15 total weight percent polymer or polymer-coated particles. These "polymeric" particles facilitate debris removal without the detrimental impact of dielectric erosion or interconnect abrasion, dishing or erosion. Most advantageously, the solution contains 0 to 10 total weight percent polymeric or polymer-coated particles. Surfactants or polymers such as polyvinyl pyrrolidone can bond to abrasives to provide the polymer-coated particles.

The polishing solutions may also include levelers such as, ammonium chloride, to control surface finish of the interconnect metal. In addition to this, the solution optionally may contain a biocide for limiting biological contamination. For example, Neolone™ M-50 biocide 2-Methyl-4-isothiazolin-3-one in propylene glycol (Rohm and Haas Company) provides an effective biocide for many applications.

The solution provides a tantalum nitride to TEOS selectivity of at least 3 to 1 as measured with a microporous polyurethane polishing pad pressure measured normal to a wafer of less than 20.7 kPa. A particular polishing pad useful for determining selectivity is the Politex microporous polyurethane polishing pad. Advantageously, the solution provides a tantalum nitride to TEOS selectivity of at least 5 to 1 as measured with a microporous polyurethane polishing pad pressure measured normal to a wafer of less than 20.7 kPa; and most advantageously, this range is at least 10 to 1. And the solution can provide tantalum nitride to TEOS selectivity ratios in excess of 100 to 1. Adjusting the pH, oxidizer concentration and tantalum removal agent concentrations adjusts the tantalum barrier removal rate. Adjusting the inhibitor, oxidizer, complexing agent and leveler concentrations adjusts the etch rate of the interconnect metals.

EXAMPLES

In the Examples numerals represent examples of the invention and letters represent comparative examples. In addition, all example solutions contained 0.01 weight percent Neolone™ M-50 biocide 2-Methyl-4-isothiazolin-3-one in propylene glycol and 0.01 ammonium chloride brightener.

Example 1

This experiment measured removal rates of: TaN barrier, Ta barrier, a dielectric layer of TEOS, a low-k dielectric version of silicon dioxide derived from processing a tetraethyforthosilicate precursor and copper. In particular, the test determined the effect of specific tantalum removal agents, oxidizers and inhibitors in a second step polishing operation. A Strausbaugh polishing machine using a Politex polyurethane polishing pad (Rodel, Inc.) under downforce conditions of about 3 psi (20.7 kPa) and a polishing solution flow rate of 200 cc/min, a platen speed of 120 RPM and a carrier speed of 114 RPM planarized the samples. The polishing solutions had of pH=9 adjusted with the use of KOH and $HNO_3$ and all solutions contained deionized water. In addition, polishing solutions include 1 weight percent silica abrasive having an average particle size of 50 nm.

TABLE 1

| Solution | Additive | Wt % | BTA WT % | $H_2O_2$ WT % | TaN A/min | TEOS A/min | Cu A/min | Ta A/min |
|---|---|---|---|---|---|---|---|---|
| A | | 0 | 0.1 | | 25, 11 | 30 | 146 | |
| 1 | GAA | 3.0 | 0.2 | | 1055 | 17 | 143 | |
| 2 | GS | 3.0 | 0.2 | | 1610 | 40 | 170 | 1340 |
| 3 | GHCL | 2.5 | 0.2 | | 1758 | 70 | 68 | |
| 4 | GHCL | 2.5 | 0.2 | 0.8 | 601 | 27 | 601 | |
| 5 | GHCL | 2.5 | 0.2 | 1.8 | 563 | 24 | 195 | |
| 6 | GHCL | 2.5 | 0.2 | 2.8 | 565 | 26 | 165 | |
| 7 | GHCL | 2.0 | 0.8 | | 2200 | 57 | −19 | 1935 |
| 8 | GHCL | 1.0 | 0.8 | | 2203 | 88 | 193 | 2034 |
| 9 | AGHCL | 2.5 | 0.8 | | 1763 | 66 | 204 | |
| 10 | GHCL | 2.0 | 0.05 | | 1221 | 56 | 75 | 1765 |
| 11 | FS | 3.0 | 0.20 | | 1123, 1153 | 142 | | |
| 12 | FA | 3.0 | 0.20 | | 2197 | −5 | 99 | |

GAA=guanidine acetic acid, GS=guanidine sulfate, GHCL=guanidine hydrochloride, AGHCL=amino guanidine hydrochloride, BTA=benzotriazole, TaN=talum nitride, TEOS=tetraethylorthosilicate (dielectric), Cu=copper (metal), Ta=tantalum barrier, FS=formamidinesulfinic acid and FA=Formamidine acetate.

The above Table indicates that guanidine and formamidine compounds provide a high removal selectivity for tantalum barrier materials with respect to dielectrics and interconnect metals. In addition, the tests confirmed that Ta and TaN removal are of similar magnitudes when polished with the same polishing solution—see solutions 2, 7, 8 and 10. The hydrogen peroxide oxidizer of Solutions 4 to 6, however, reduced the TaN removal rate at the pH of this test. This rate, however, is far greater than those achieved with comparative Solution A that lacked a guanidine or formamidine compound.

The data illustrate that the guanidine and formamidine barrier removal agents provided removal rates for the TaN barrier layer at a rate of at least 1000 Angstroms per minute in all cases. Solutions 7 and 10 recorded in Table 1, establish that the corrosion inhibitor BTA enhances the barrier removal rate. In particular, the TaN removal rate increased from 1221 Angstroms per minute to 2200 Angstroms per minute as the BTA concentration increased from 0.05 weight percent BTA to 0.8 weight percent BTA.

Example 2

The testing of Example 2 used the solution and equipment of Example 1, but the solution did not contain any silica abrasive additions.

TABLE 2

| Solution | Additive | Wt % | BTA Wt % | TaN A/min | TEOS A/min | Cu A/min |
|---|---|---|---|---|---|---|
| 13 | GHCL | 1.0 | 0.05 | 1072 | −1 | 110 |
| 14 | GHCL | 1.0 | 0.20 | 1051 | −1 | 49 |
| 15 | GHCL | 0.5 | 0.20 | 1373 | −2 | 12 |
| 16 | GHCL | 1.0 | 0.20 | 1587 | −3 | 9 |
| 17 | GHCL | 3.0 | 0.20 | 1042 | −4 | 6 |

The above data establish that removing abrasive from the solution decreased dielectric removal rates to undetectable removal rates. These solutions have a TaN to TEOS selectivity of at least 100 to 1.

Example 3

The testing of Example 3 used the solution and equipment of Example 1, but the solution contained various pH levels.

TABLE 3

| Solution | Additive | Wt % | pH | TaN A/min | TEOS A/min | Cu A/min |
|---|---|---|---|---|---|---|
| 18 | GHCL | 1.0 | 11 | 1166 | −4 | 32 |
| 19 | GHCL | 1.0 | 7 | 211 | −4 | 37 |
| 20 | GHCL | 1.0 | 5 | 10 | −4 | 26 |
| 21 | GHCL | 1.0 | 3 | 9 | −3 | 29 |

These data illustrate the polishing solution's utility at high pH levels. At low pH levels, the solution requires the addition of an oxidizer, as shown in Example 4 below.

Example 4

This Example illustrates the effectiveness of adding an oxidizer to low pH solutions. Specifically, this test relied upon a down force of 2 psi (13.8 kPa), table velocity 120 RPM, carrier velocity 114 RPM and a slurry flow rate of 200 cc/min. to pH 3 and 5 solutions containing 0.6 weight percent $H_2O_2$.

TABLE 4

| Solution | $H_2O_2$ wt % | GHC wt % | pH | Silica wt % | BTA | Ta A/min | TaN A/min | Cu A/min |
|---|---|---|---|---|---|---|---|---|
| B | 0.6 | 0 | 3 | 2% | 0.10% | 45 | 183 | 132 |
| 22 | 0.6 | 0.5 | 3 | 2% | 0.10% | >1000 | 2060 | 77 |
| C | 0.6 | 0 | 5 | 2% | 0.10% | 29 | 107 | 148 |
| 23 | 0.6 | 0.5 | 5 | 2% | 0.10% | >1000 | 1537 | 107 |
| 24 | 0.6 | 1 | 5 | 2% | 0.10% | >1000 | 1753 | 109 |

The above data illustrate the $H_2O_2$ significant increase in removal rate achieved by adding an oxidizer to the low-pH solutions.

Example 5

The testing of Example 5 used the solution and equipment of Example 1, with the polishing conditions established in Table 5. The solution contained water at a of pH 8.0, 0.20% BTA, 1% GHCL, 0.5% citric acid, 0.01% Neolone M50 and 0.01% colloidal silica of 12 nm average particle size.

TABLE 5

| Down-force psi | Down-force kPa | Platen RPM | Carrier RPM | Flow ml/min. | TaN A/min | TEOS A/min | Cu A/min |
|---|---|---|---|---|---|---|---|
| (1) | 6.9 | 120 | 114 | 200 | 745 | 3 | 0-5 |
| (2) | 13.8 | 120 | 114 | 200 | 1658 | 4 | 28 |
| (3) | 20.7 | 120 | 114 | 200 | 2619 | 5 | 57 |

The experiments recorded in Table 4, indicate that, a guanidine compound removes a metal, TaN, a known barrier metal, with sufficient removal rate and selectivity, with a low downforce of 1 psi to 3 psi (6.9 to 20.7 kPa). In addition, the 0.01 weight percent colloidal silica produced an insignificant change in the removal rates, but cleared residuals of TaN remaining to reduce uneven removal of the TaN surface layer.

For purposes of the specification, the term dielectric refers to a semi-conducting material of dielectric constant, k, which includes low-k and ultra-low-k dielectric materials. This process removes tantalum barrier materials with little effect on conventional dielectrics and low-k dielectric materials. Since the solutions provide effective barrier removal rates with little or no abrasives at low pressures (i.e. less than 21.7 kPa) and high tantalum selectivity, it facilitates polishing with low dielectric erosion rates. The solution and method are excellent for preventing erosion of multiple wafer constituents, including the following: porous and nonporous low-k dielectrics, organic and inorganic low-k dielectrics, organic silicate glasses (OSG) and identified by the chemical notation, $Si_wC_xO_yH_z$, wherein, w, x, y and z represent the number of atoms, fluorosilicate glass, (FSG), carbon doped oxide (CDO), TEOS, a silica derived from tetraethylorthosilicate, and any of the hard mask materials, such as TEOS, $Si_wC_xO_yH_z$, SiCH, $Si_xN_y$, $Si_xC_yN_z$, and SiC.

Advantageously, the polishing solution contains less than 5 weight percent abrasive to limit erosion and the polishing removes the tantalum barrier material at a rate of at least three times greater than the dielectric removal rate as expressed in angstroms per minute. Most advantageously, the polishing solution contains less than 1 weight percent abrasive to further limit erosion and the polishing removes the tantalum barrier material at a rate of at least five times greater than the dielectric removal rate as expressed in angstroms per minute.

The solution and method provide excellent selectivity for removing tantalum barrier materials such as tantalum, tantalum nitride and tantalum oxide. The solution selectively removes tantalum barrier materials with reduced dielectric erosion. For example, the solution can remove tantalum barriers without a detectable TEOS loss and without peeling or delaminating low-k dielectric layers. In addition to this, the solution reduces dishing, erosion and scratching of copper interconnects.

The invention claimed is:

1. A chemical mechanical planarization solution useful for removing a tantalum barrier material from a semiconductor wafer comprising by weight percent 0.02 to 15 inhibitor for a nonferrous metal, 0 to 20 complexing agent for the nonferrous metal, 0.01 to 12 tantalum removal agent selected from the group consisting of formamidine, formamidine salts, formamidine derivatives, guanidine, guanidine derivatives, guanidine salts and mixtures thereof, 0 to 5 abrasive, 0 to 15 particles selected from the group consisting of polymeric particles and polymer-coated coated particles and balance water and the solution being oxidizer free, a pH greater than 5 to 12 and has a tantalum nitride to TEOS selectivity of at least 3 to 1 as measured with a microporous polyurethane polishing pad pressure measured normal to a wafer of less than 20.7 kPa.

2. The solution of claim 1 wherein the tantalum removal agent is present in an amount of 0.1 to 10 weight percent.

3. The solution of claim 1 wherein the inhibitor includes an azole inhibitor.

4. The solution of claim 1 wherein the tantalum removal agent is selected from the group consisting of guanidine hydrochloride, guanidine sulfate, amino-guanidine hydrochloride, guanidine acetic acid, guanidine carbonate, guanidine nitrate, formamidine, formamidinesulfinic acid, formamidine acetate and mixtures thereof.

5. A chemical mechanical planarization solution useful for removing a tantalum baffler material from a semiconductor wafer comprising by weight percent 0.02 to 10 inhibitor for a nonferrous metal, 0 to 10 complexing agent for the nonferrous metal, 0.1 to 10 tantalum removal agent selected from the group consisting of formamidine, formamidine salts, formamidine derivatives, guanidine, guanidine derivatives, guanidine salts and mixtures thereof, 0 to 0.09 abrasive, 0 to 10 particles selected from the group consisting of polymeric particles and polymer-coated coated particles and balance water and the solution being oxidizer free with a pH greater than 5 to 12.

6. The solution of claim 5 wherein the tantalum removal agent is selected from the group consisting of guanidine hydrochloride, guanidine sulfate, amino-guanidine hydrochloride, guanidine acetic acid, guanidine carbonate, guanidine nitrate, formamidine, formamidinesulfinic acid, formamidine acetate and mixtures thereof, and the tantalum removal agent is 0.2 to 6 weight percent.

7. The solution of claim 5 wherein the inhibitor is an azole present in an amount of 0.02 to 5 weight percent.

8. The solution of claim 1 wherein the solution is abrasive-free.

9. The solution of claim 5 wherein the solution is abrasive-free.

* * * * *